(12) United States Patent
Kabata et al.

(10) Patent No.: US 6,821,694 B2
(45) Date of Patent: Nov. 23, 2004

(54) IMAGE FORMING METHOD, IMAGE FORMING APPARATUS, PROCESS CARTRIDGE AND PHOTOCONDUCTOR

(75) Inventors: Toshiyuki Kabata, Yokohama (JP); Toshio Fukagai, Numazu (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/272,828

(22) Filed: Oct. 18, 2002

(65) Prior Publication Data

US 2003/0129511 A1 Jul. 10, 2003

(30) Foreign Application Priority Data

Oct. 19, 2001 (JP) ........................................ 2001-321924
Oct. 11, 2002 (JP) ........................................ 2002-299482

(51) Int. Cl.[7] .............................. G03G 9/08; B41J 2/44
(52) U.S. Cl. ...................... 430/56; 430/58.05; 347/129; 347/140; 399/159; 399/177
(58) Field of Search ................................ 430/56, 58.05; 399/159, 177; 347/129, 140

(56) References Cited

U.S. PATENT DOCUMENTS

| | | |
|---|---|---|
| 5,339,138 A | 8/1994 | Mishima et al. |
| 5,427,880 A | 6/1995 | Tamura et al. |
| 5,436,092 A | 7/1995 | Ohtsuka et al. |
| 5,608,010 A | 3/1997 | Tamura et al. |
| 5,670,284 A | 9/1997 | Kishi et al. |
| 6,521,388 B2 * | 2/2003 | Kabata et al. .............. 430/126 |
| 6,627,371 B2 * | 9/2003 | Hasegawa et al. ............ 430/69 |

* cited by examiner

*Primary Examiner*—John L Goodrow
(74) *Attorney, Agent, or Firm*—Oblon, Spivak, McClelland, Maier & Neustadt, P.C.

(57) ABSTRACT

An image forming method wherein a surface of a photoconductor having a photoconductive layer provided on a conductive support is scanned at least along a main scanning direction of the photoconductor with a writing light beam having a wavelength of $\lambda$ $\mu$m and a spot diameter $\phi$ $\mu$m to form an electrostatic latent image thereon. The surface of the photoconductor has such a roughness that the sectional curve thereof along the main scanning direction is represented by a function $y=f(x)$ when the main scanning direction and the direction of the vertical height are assumed to be the X-axis and the Y-axis, respectively. The maximum height of the sectional curve in a region from an arbitral position x on the X-axis to a position $(x+\phi)$ on the X-axis is at least $\lambda/2n$ $\mu$m where n is a refractive index of the photoconductive layer at the wavelength of the light beam.

23 Claims, 3 Drawing Sheets

IMAGE FORMING METHOD, IMAGE FORMING APPARATUS, PROCESS CARTRIDGE AND PHOTOCONDUCTOR

BACKGROUND OF THE INVENTION

The present invention relates to an image forming method, an image forming apparatus, a photoconductor and a process cartridge using the photoconductor.

An image forming process employing coherent light such as laser beam for writing light is widely used in a field of electrophotography for forming a digital image, for example in copying machines, printers and facsimiles. In such a process, there tends to arise a problem of occurrence of interference fringes in a formed image due to interference of coherent light in a photoconductor.

It is known that when the photoconductor meets with the following relation:

$$2nd = m\lambda$$

(wherein n is a reflective index of a charge transporting layer, d is a thickness of the charge transporting layer, $\lambda$ is a wavelength of the writing light and m is an integer), the writing light is enhanced to cause interference fringes.

For example, when $\lambda=780$ nm and $n=2.0$, a set of interference fringes is generated every time the thickness of the charge transporting layer is changed by 0.195 $\mu$m. In order to eliminate such interference fringes completely, therefore, the charge transporting layer should have a thickness variation not greater than 0.195 $\mu$m all over the image forming area. However, it is very difficult to produce such a photoconductor for an economical reason. Thus, various methods for restraining interference fringes have been proposed.

For example, Japanese Laid-Open Patent Publication No. S57-165845 discloses a photoconductor having a charge generating layer containing amorphous Si, wherein a light absorbing layer is provided on a surface of an aluminum support to prevent mirror reflection of light on the surface of the support, thereby preventing occurrence of interference fringes. This method is effective to a photoconductor having a layer structure consisting of an aluminum support/a charge transporting layer/a charge generating layer such as an amorphous Si photoconductor but is not very effective to a photoconductor having a layer structure consisting of an aluminum support/a charge generating layer/a charge transporting layer as seen in many organic photoconductors.

Japanese Laid-Open Patent Publication No. H07-295269 discloses a photoconductor having a layer structure consisting of an aluminum support/an under coat layer/a charge generating layer/a charge transporting layer, wherein a light absorbing layer is provided on the aluminum support to prevent interference fringes. However, even with this photoconductor, it is impossible to prevent interference fringes completely.

Japanese Examined Patent Publication No. H07-27262 discloses an image forming apparatus having a photoconductor including a cylindrical support having a convex shape obtained by superimposing a sub-peak on a main peak in a cross-section cut along a plane including the central axis thereof, and an optical system for irradiating coherent light with a diameter smaller than one cycle of the main peak to the photoconductor. The image forming apparatus can restrain interference fringes to a large extent with some limited types of photoconductors. However, many of photoconductors including a support having a convex shape obtained by superimposing a sub-peak on a main peak in a cross-section cut along a plane including the central axis thereof still generate interference fringes.

A photoconductor in which surface roughness of a support, an intermediate layer and/or an outermost layer is specified is known. For example, Japanese Laid-Open Patent Publication No. H10-301311 discloses a photoconductor including a photoconductive layer supported on a support, wherein the center-line surface roughness Ry of the support is at least ½ of the wavelength of the writing light beam. The photoconductor can reduce interference fringes when used in an image forming apparatus having a low resolution. However, when the spot diameter of the writing light beam is reduced so as to improve the resolution, interference fringes are unavoidably formed. The surface roughness Ra can properly represent magnitude of average unevenness of a sectional curve composed of only waves with similar amplitudes. However, an actual sectional curve of a photoconductor is composed of a multiplicity of waves of greatly different wavelengths and amplitudes. Minute waves superimposed on waves with large amplitudes are cancelled in calculating Ra and thus are not reflected in Ra at all.

Japanese Laid-Open Patent Publication No. H6-138685 discloses a photoconductor including a conductive support having a ten-point surface roughness Rz of 0.01–0.5 $\mu$m and a surface protective layer having an Rz of 0.2–1.2 $\mu$m. However, a surface protective layer is generally poor in hole transferring ability so that the photoconductor tends to cause a problem of an increase in electric potential of a latent image and to produce an unclear image by influences of ion species generated by electrification, oxidizing or reducing gas, humidity and so on. Also, it is extremely difficult to specify an Rz to eliminate interference fringes completely. When the writing light of the image forming apparatus has a high resolution, image defects such as interference fringes tend to occur.

Japanese Laid-Open Patent Publication No. H7-13379 discloses a photoconductor including an intermediate layer having and a surface protective layer for the purpose of preventing interference fringes such as moire. Further, for the purpose of preventing white spots in a solid pattern, the intermediate layer and the surface protective layer have specific ten-point surface roughness Rz of not greater than 1.0 $\mu$m. However, the Rz for each layer is not disclosed to be effective to prevent interference fringes such as moire.

Japanese Laid-Open Patent Publication No. H08-248663 discloses a photoconductor including a support having a surface roughness of 0.01 to 2.0 $\mu$m, and an outermost layer having a surface roughness of 0.1 to 0.5 $\mu$m and containing inorganic particles having an average particle diameter of 0.05–0.5 $\mu$m. However, it is not specified what kind of surface roughness is the surface roughness of the support and the outermost layer.

Conventional parameters of surface roughness include Rmax, Rz and Ra. It is well known that measured surface roughness values are largely varied depending upon the parameters adopted and upon the measurement conditions such as measurement length. Moreover, even with the same photoconductor, the degree of interference fringes vary depending upon the resolution of the image forming device, the wavelength of the writing light, the spot diameter of the writing light, etc. Thus, with the known techniques, it is impossible to produce images free of interference fringes while retaining other desired image qualities. It is also necessary to design, with a try-error technique, a desired photoconductor suited for a specific image forming device.

SUMMARY OF THE INVENTION

It is, therefore, an object of the present invention to provide an image forming method which has overcome the problems of the prior arts.

Another object of the present invention is to provide an image forming method of the above-mentioned type which is capable of producing high-quality images free from image defects such as interference fringes, streaks, and light and shade spots.

It is a further object of the present invention to provide an image forming method capable of producing a high-quality image free from image defects without lowering the resolution of an output image.

It is a further object of the present invention to provide an image forming method which permits the use of cheap support of a photoconductor.

It is a further object of the present invention to provide an image forming method capable of producing a high-quality image free from image defects at a high image forming speed.

It is a further object of the present invention to provide an image forming method capable of producing an image which is natural like a photo.

It is a further object of the present invention to provide an image forming apparatus capable of producing a high-quality image free from image defects without lowering the resolution of an output image.

It is a further object of the present invention to provide an image forming apparatus capable of forming an image on any desired image receiving medium.

It is a further object of the present invention to provide an image forming apparatus capable of forming a high quality image free of defects such as image missing, image scattering, blurs and interference fringes.

It is yet a further object of the present invention to provide a photoconductor capable of producing a high-quality image free from image defects such as interference fringes.

It is a further object of the present invention to provide a process cartridge having mounted thereon the above photoconductor which permits easy maintenance and exchange of parts contained therein.

In accordance with one aspect of the present invention, there is provided an image forming method comprising scanning a surface of a photoconductor having a photoconductive layer provided on a conductive support at least along a main scanning direction of said photoconductor with a writing light beam having a wavelength of $\lambda$ μm and a spot diameter $\phi$ μm to form an electrostatic latent image thereon, wherein the surface of said photoconductor has such a roughness that the sectional curve thereof along said main scanning direction is represented by a function y=f(x) when the main scanning direction and the direction of the vertical height are assumed to be the X-axis and the Y-axis, respectively, and wherein the maximum height of said sectional curve in a region from an arbitral position x on the X-axis to a position (x+φ) on the X-axis is at least $\lambda/2n$ μm where n is a refractive index of said photoconductive layer at the wavelength of said light beam, said maximum height being a distance between the maximum level in the direction of the Y-axis of the sectional curve in said region and the minimum level in the direction of the Y-axis of the sectional curve in said region.

In another aspect, the present invention provides an image forming apparatus comprising a photoconductor having a photoconductive layer provided on a conductive support, and an exposing means for scanning a surface of the photoconductor with a writing light beam having a wavelength of $\lambda$ μm and a spot diameter $\phi$ μm at least along a main scanning direction to form an electrostatic latent image thereon, wherein the surface of said photoconductor has such a roughness that a sectional curve thereof along said main scanning direction is represented by a function y=f(x) when the main scanning direction and the direction of the vertical height are assumed to be the X-axis and the Y-axis, respectively, and wherein the maximum height of said sectional curve in a region from an arbitral position x on the X-axis to a position (x+φ) on the X-axis is at least $\lambda/2n$ μm where n is a refractive index of said photoconductive layer at the wavelength for said light beam, said maximum height being a distance between the maximum level in the direction of the Y-axis of the sectional curve in said region and the minimum level in the direction of the Y-axis of the sectional curve in said region.

The present invention also provides a photoconductor adapted to be scanned with a writing light beam having a wavelength of $\lambda$ μm and a spot diameter $\phi$ μm at least along a main scanning direction to form an electrostatic latent image thereon, comprising a photoconductive layer provided on a conductive support, wherein the surface of said photoconductor has such a roughness that the sectional curve thereof along the main scanning direction is represented by a function y=f(x) when the main scanning direction and the direction of the vertical height are assumed to be the X-axis and the Y-axis, respectively, and wherein the maximum height of said sectional curve in a region from an arbitral position x on the X-axis to a position (x+φ) on the X-axis is at least $\lambda/2n$ μm where n is a refractive index of said photoconductive layer at the wavelength of said light beam, said maximum height being a distance between the maximum level in the direction of the Y-axis of the sectional curve in said region and the minimum level in the direction of the Y-axis of the sectional curve in said region.

The present invention further provides a process cartridge freely detachable from an image forming apparatus, comprising the above photoconductor, and at least one means selected from the group consisting of charging means, image exposure means, developing means, image transfer means, and cleaning means.

Interference fringes of an image formed by electrophotography employing a coherent light are considered to be attributed to differences in image density among pixels caused as a result of multiple reflection of the light in the photoconductor surface. It has been found that when such multiple reflection occurs in each pixel, the image density level of the image as a whole varies uniformly, and that when the pixel is sufficiently small, interference fringes in each pixel are hardly recognized with the naked eyes. Namely, when very minute interference fringes invisible with naked eyes are positively formed, the interference fringes have been found not to be visually recognized as a whole. It has also been found that interference fringes may be prevented when minute unevenness of specific characters is provided on a surface of a photoconductor.

When an electrostatic latent image is formed on a surface of the photoconductor by irradiation with a light having a specific light spot diameter and when an arbitral region of the surface having a diameter equal to the light spot diameter has a portion in which the writing light strength is intensified by an light interference therewithin but has no portion in which the writing light strength is weakened by light interference, then the average intensity of the writing light in that region is greater as compared with the case in which no light interference occurs. Namely, the image density corresponding to that portion (pixel) is relatively high. Conversely, when an arbitral region of the surface having a diameter equal to the light spot diameter has a portion in which the writing light strength is reduced by an light interference therewithin but has no portion in which the writing light strength is increased by light interference, then the average intensity of the writing light in that region is lower as compared with the case in which no light interference occurs. Namely, the image density corresponding to that region (pixel) is relatively low. Such a variation of the image density will cause image defects such as interference fringes.

On the other hand, when an arbitral region of the surface of the photoconductor having a diameter equal to the light spot diameter has a portion in which the writing light strength is intensified by an light interference therewithin and another portion in which the writing light strength is reduced by an light interference therewithin, then the average intensity of the writing light in that region is similar to the case in which no light interference occurs. Namely, the image density corresponding to that region (pixel) is nearly equal to the ordinary case. Since the area of one pixel is too small to be recognized by the naked eyes, no image defects such as interference fringes occur.

BRIEF DESCRIPTION OF DRAWINGS

Other objects, features and advantages of the present invention will become apparent from the detailed description of the preferred embodiments of the invention which follows, when considered in the light of the accompanying drawings, in which.

DETAILED DESCRIPTION OF PREFERRED EMBODIMENT OF THE INVENTION

An image forming method according to the present invention comprises irradiating or scanning a surface of the photoconductor imagewise with a coherent light having a wavelength of $\lambda$ $\mu$m and a spot diameter $\phi$ $\mu$m along at least a main scanning direction of the photoconductor to form an electrostatic latent image thereon. The photoconductor comprises a support and a photoconductive layer provided on the support. The photoconductor may further comprise an under-coating layer between the support and the photoconductive layer, when desired. The photoconductive layer may be a single layer including at least a charge generating material and a charge transporting material or may be a laminate layer including a charge generating layer and a charge transporting layer provided on the charge generating layer.

The photoconductive layer has a refractive index of n at the wavelength ($\lambda$ $\mu$m) of the writing light beam. In the case of a single layer, the refractive index n is that of the photoconductive layer. In the case of the laminate layer, the refractive index n is that of the charge transporting layer. The refractive index n is generally in the range of 1.2 to 3.0, preferably 1.3 to 2.5, more preferably 1.4 to 2.2, for reasons of formation of a sharp electrostatic latent image and satisfactory sensitivity.

Figure 1:
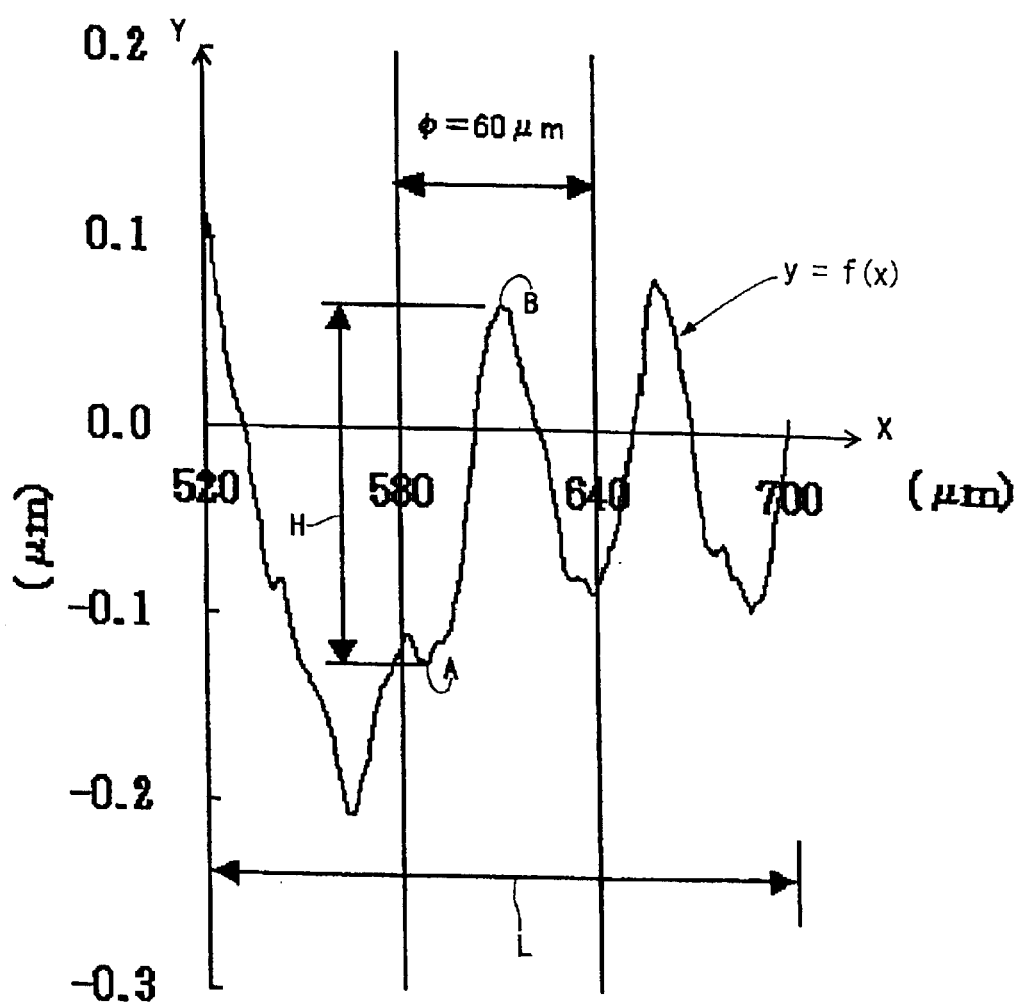
FIG. 1 is a schematic illustration of a sectional curve of a surface of a photoconductor.

The surface of the photoconductor has such a roughness that a sectional curve thereof sampled from an arbitral location on the surface of the photoconductor along the main scanning direction, which is schematically illustrated in FIG. 1, is represented by a function y=f(x) when the main scanning direction and the direction of the vertical height or magnitude are assumed to be the X-axis and the Y-axis, respectively. In FIG. 1, the sectional curve through a length L $\mu$m along the X-axis between positions 520 $\mu$m and 700 $\mu$m spaced apart from a reference point (not shown), respectively, is shown.

It is important that the maximum height of the sectional curve in a region from an arbitral position x on the X-axis to a position (x+$\phi$) on the X-axis is at least $\lambda/2n$ $\mu$m, where $\phi$ is a spot diameter in $\mu$m of the writing light beam and n is a refractive index of the photoconductive layer at the wavelength ($\lambda$ $\mu$m) of the writing light beam.

For example, in the specific example shown in FIG. 1, when the spot diameter $\phi$ of the writing light beam is 60 $\mu$m and when the position x is a position 580 $\mu$m spaced apart from the reference point, the maximum height in the region between 580 and 640 must be at least $\lambda/2n$ $\mu$m. The maximum height as used herein is a distance H between the maximum level (B) in the direction of the Y-axis of the sectional curve in that region and the minimum level (A) in the direction of the Y-axis of the sectional curve in that region.

The maximum height H varies with the position x. When the maximum height H is plotted against the position x, a profile of the maximum height H can be obtained. In the present invention, the minimum value of the maximum height H in such a profile must be $\lambda/2n$ $\mu$m or more. The maximum height is preferably at least 1.05×$\lambda/2n$ $\mu$m, more preferably at least 1.10×$\lambda/2n$ $\mu$m. The greater the maximum height, the less becomes the tendency of occurrence of interference fringes. However, from the standpoint of prevention of image scattering or blurs, the maximum height is preferably not more than 5×$\lambda/2n$ $\mu$m, more preferably not more than 4×$\lambda/2n$ $\mu$m.

The sectional curve of a surface of the photoconductor may be obtained by measuring a profile of the surface through a preset length along the main scanning direction. As a method of measuring a sectional curve of a surface of the photoconductor in the present invention, any conventional method such as an optical method, an electrical method, an electrochemical method or a physical method can be employed as long as it has high reproducibility, measurement accuracy and simplicity. Among those, an optical method or a physical method is preferred because of its simplicity, and especially, a physical method using a tracer is preferred most because of its high reproducibility and accuracy.

The measurement of the surface profile is conducted in a main scanning direction of the writing light on the photoconductor for image formation. Namely, the direction of a line on the surface of the photoconductor along which the sectional curve is measured is in parallel with the main scanning direction. In the case of a drum-shaped photoconductor, the main scanning direction is in parallel with the axial direction thereof. In the case of a belt or sheet photoconductor, the main scanning direction is normal to the moving direction thereof. The measuring length (L in FIG. 1) is desirably at least 10$\phi$ $\mu$m and is not shorter than the base length referred to in JIS B0601-1994 "Measurement of Surface Roughness". The location at which the surface profile is measured may be any arbitral position on the surface of the photoconductor which is scanned with the writing light beam and may be selected according to performance of the image forming device employed. In the case of a drum or endless belt photoconductor, it is generally sufficient that 1–5 surface profiles are measured through a length L of 2.5–5 mm along the main scanning direction in each of two to four circumferentially equally divided sections of the photoconductor.

It is preferred that the surface of the photoconductor have such a roughness that not only the maximum height of the sectional curve in the main scanning direction but also the maximum height of a sectional curve in the sub-scanning direction which is normal to the main scanning direction is at least $\lambda/2n$ μm in a region of a length of $\phi$ μm.

It is more preferred that the surface of the photoconductor has such a roughness that the sectional curve thereof is represented by a function $y=f(x)$ when any arbitral direction on the surface and the direction of the vertical magnitude are assumed to be the X-axis and the Y-axis, respectively, and wherein the maximum height of the sectional curve in a region from an arbitral position x on the X-axis to a position $(x+\phi)$ on the X-axis is at least $\lambda/2n$ μm where n is a refractive index of the photoconductive layer at the wavelength of the light beam.

The diameter $\phi$ of the spot of the writing light beam on the surface of the photoconductor is not critical. From the standpoint of a high grade image with high resolution, however, the spot diameter $\phi$ is generally not more than 100 μm, preferably not more than 60 μm, more preferably not more than 50 μm. The spot diameter as used herein is intended to refer to the diameter of the spot of the writing light beam on the surface of the photoconductor in the direction parallel with the main scanning direction. In the case of a drum-shaped photoconductor, the spot diameter is in parallel with the axial direction thereof. In the case of a belt or sheet photoconductor, the spot diameter is normal to the moving direction thereof. Thus, when the spot of the writing light beam on the surface of the photoconductor is ellipsoidal in shape with the major axis thereof being in parallel with the sub-scanning direction, the minor axis represents the spot diameter.

The number of the writing light beam may be one (single-beam) or plural (multi-beam). The method of the present invention is particularly effective in multi-beam image writing.

Methods for roughening the surface of the photoconductor for use in the image forming method of the present invention include physical processing such as processing with an abrasive, an abrasive paper (tape), a grinder (a buffing machine or a sand blast); chemical or electrochemical surface roughening; surface roughening utilizing heat, such as heat ray irradiation, pressing of a heated photoconductor onto a mold having a roughened surface or pressing a heated mold having a roughened surface onto a photoconductor; a method in which the conditions at the time of producing the photoconductor, such as temperature and humidity, are controlled; a method in which a layer, such as a protecting layer, containing particles is formed such that the particles are exposed on the surface thereof; and a method in which an outer surface of a support on which a photoconductive layer is formed is mechanically roughened.

Above all, a mechanical or physical processing method and a method in which particles are exposed from the photoconductor surface are preferred for reasons of productivity and reproducibility. Especially, the method in which particles are exposed on the photoconductor surface can accomplish a properly roughened, ideal surface condition with high reproducibility. The particles for use in this method generally have a diameter of 0.01 to 1.00 μm, preferably 0.05 to 0.80 μm, more preferably 0.10 to 0.60 μm. A diameter of no more than 1.00 μm is desired for reasons of prevention of undulation of the photoconductor surface and occurrence of spots, non-uniformity in a printed image and discharge breakdown. A diameter or at least 0.01 μm is desirable for reasons of attaining proper roughness of the photoconductor surface the prevention of interference fringes. The particles contained in the surface layer of the photoconductor preferably have a refractive index 0.8 to 1.2 times, more preferably 0.85 to 1.15 times that of the charge transporting layer for reasons of good resolution of printed images.

Particles which hardly absorb writing light are preferably used. Examples of such particles include particles of fluoroplastics (e.g. polytetrafluoroethylene), silicone resins, phenol resins, carbonate resins; particles of above resins to which a charge transporting function is imparted; and particles of metal oxides, glass, i-carbon and diamond. Among those, particles of metal oxides such as titanium oxide, aluminum oxide, silicone oxide, tin oxide, iron oxide and zirconium oxide are preferred because these can appropriately realize a surface condition suitable for a photoconductor for use in the image forming apparatus of the present invention. Above all, aluminum oxide is preferred because it has a refractive index which is close to that of a charge transporting layer and is chemically stable. Especially, α-type aluminum oxide is most preferable because it can impart strength to the surface of the photoconductor.

Since aluminum oxide may be easily colored with a small amount of impurity and colored aluminum oxide may absorb writing light or may be lowered in hardness, aluminum oxide for use in the present invention has a purity of at least 3N, preferably at least 4N, more preferably at least 5N.

Although the particles may be applied onto a surface of a photoconductor by either a dry method or a wet method, a wet method, which is excellent in mass-productivity and with which the surface condition of the photoconductor can be easily controlled, is preferred. Thus, the particles can be applied by a method comprising steps of applying a resin solution containing the particles on a surface of the photoconductor and removing the solvent from the resin solution. The application of the resin solution may be performed by any conventional technique such as dip coating, ring coating, roll coating, die coating, blade coating or spray coating. Above all, spray coating, in which the coating liquid adheres in the form of droplets and the droplets are combined to form a film, is preferred for the purpose of moderately roughening the photoconductor surface.

The resin solution for use in application of the particles is not specifically limited as long as it has film forming properties and is capable of affording a film having sufficient strengths. It is preferred that the resin solution form a film having hole transferring ability for reasons of prevention of an increase of a potential of a latent image A coating liquid for forming a charge transporting layer, which will be described in detail hereinafter, may be more preferably used as the resin resolution after dispersing the particles therein.

The particle-containing resin solution desirably contains a thickening agent or a thixotropic agent because metal oxide particles generally have a larger specific gravity than the resin resolution. When the resin solution contains a charge transporting material, a small amount of an acceptor material such as a weak acid may be added thereto for imparting thixotropy to the resin resolution and improving the dispersibility of the particles and the hole transferring ability of the film. Thereby, an increase of the potential of a latent image can be prevented. The thickness of the particle-containing layer is generally 1–10 μm, preferably 2–8 μm for reasons of easiness in producing desired roughness.

The use of a drum machined with a flat cutting tool which permits high speed cutting, an unmachined drum or an unmachined belt as a conductive support may provide suitable surface roughness of the photoconductive layer at a reduced manufacturing cost. The flat cutting tool.

The support of the photoconductor of the present invention may be a drum or a belt of a metal such as copper, aluminum, gold, silver, platinum, iron, palladium, nickel or an alloy thereof or a composite belt having a plastic sheet on which a layer of a metal, such as those described above, or a metal oxide, such as tin oxide or indium oxide, is provided by vacuum deposition or electroless plating.

The undercoat layer of the photoconductor may be a resin layer, a layer composed of a white pigment and a resin, or a metal oxide film obtained by chemically or electrically oxidizing a surface of a conductive support. Among those, a composition mainly composed of a white pigment and a resin is preferred. Examples of the white pigment include metal oxides such as titanium oxide, aluminum oxide, zirconium oxide and zinc oxide. Above all, titanium oxide, which is excellent in preventing injection of electrical charge from a conductive support, is most preferred. Examples of the resin for use in the undercoat layer include thermoplastic resins such as polyamide, polyvinyl alcohol, casein, methylcellulose; and thermosetting resins such as acrylic resins, phenol resins, melamine resins, alkyd resins, unsaturated polyethylene resins and epoxy resins. These resins may be used alone or in combination.

Examples of charge generating materials for use in the photoconductor include organic pigments and dyes such as mono azo pigments, bis azo pigments, tris azo pigments, tetrakis azo pigments, triarylmethane dyes, thiazine dyes, oxiazine dyes, xanthene dyes, cyanine dyes, styryl dyes, pyrylium dyes, quinacridone pigments, indigo pigments, perylene pigments, polycyclic quinon pigments, bisbenzimidazole pigments, indanthrene pigments, squalirium pigments, phthalocyanine pigments; and inorganic materials such as selenium, selenium-arsenic, selenium-tellurium, cadmium sulfide, zinc oxide, titanium oxide, amorphous silicone. The charge generating materials may be used alone or in combination.

Examples of charge transporting material include anthracene derivatives, pyrene derivatives, carbazole derivatives, tetrazole derivatives, metallocene derivatives, phenothiadine derivatives, pyrazoline compounds, hydrazone compounds, styryl compounds, styrylhydrazone compounds, enamine compounds, butadiene compounds, distyryl compounds, oxazole compounds, oxadiazole compounds, thiazol compounds, imidazole compounds, triphenylamine derivatives, phenylenediamine derivatives, aminostilbene derivatives and triphenylmethane. The charge transporting material may be used alone or in combination.

As a binder resin for use in formation of the charge generating layer and the charge transferring layer, any well-known thermoplastic resin, thermosetting resin, photosetting resin or photoconductive resin can be used as long as it is electrically nonconductive. Examples of the binder resin include thermoplastic resins such as polyvinyl chloride resins, polyvinylidene chloride resins, vinyl chloride-vinyl acetate copolymer resins, vinyl chloride-vinyl acetate-maleic anhydride terpolymer resins, ethylene-vinyl acetate copolymer resins, polyvinyl butyral resins, polyvinyl acetal resins, polyester resins, phenoxy resins, (metha)acrylic resins, polystyrene resins, polycarbonate resins, polyallylate resins, polysulfone resins, polyethersulfone resins, and ABS resins; thermosetting resins such as phenol resins, epoxy resins, urethane resins, melamine resins, isocyanate resins, alkyd resins, silicone resins, thermosetting acrylic resins; and photoconductive resins such as polyvinyl carbazole resins, polyvinyl anthracene resins, polyvinyl pyrene resins. The binder resins may be used alone or in combination, and are not limited to the above examples.

The wavelength of writing light for use in the image forming method of the present invention is not specifically limited but is generally not grater than 700 nm, preferably not greater than 675 nm, more preferably 400 to 600 nm. The image forming apparatus of the present invention can produce an excellent image with a high resolution and high definition without generating image defects such as streaks and interference fringes even with writing light with a short wavelength of 600 nm or less, which can produce an output image with high resolution.

The method for reproducing gradation for use in the image forming apparatus of the present invention is not specifically limited. In a multi-level gradation reproducing system, density of pixels is set in a stepwise. Thus, an image forming apparatus employing a conventional photoconductor tends to generate interference fringes in a printed image, and the tendency is strong in an image forming apparatus employing a pulse width modulation system, a power modulation system or a system in which width modulation and power modulation are combined. However, the image forming apparatus of the present invention does not generate interference fringes even with a multi-level gradation reproducing system.

The resolution of the image forming apparatus of the present invention is not specifically limited. The image forming apparatus can produce a high-quality image when the resolution is 1000 dpi or higher, preferably 1200 dpi or higher. In such an output image with a high resolution, the characteristics of the photoconductor tend to be reflected. Thus, an image forming apparatus employing a conventional photoconductor is apt to generate image defects such as streaks and interference fringes. However, the image forming apparatus of the present invention is free from such problems.

It is desired that the photoconductor surface should maintain the required conditions as long as possible. In order to maintain the condition of the photoconductor surface, an image forming method without a cleaning blade such as in a cleanerless system, an image forming method in which image forming is conducted while a lubricating material is applied on the photoconductor surface, or a combination thereof is preferred. As a method for maintain the required roughness of the photoconductor surface within a range specified in the present invention, there is a method in which the photoconductor surface is forcibly ground with a blade, brush or the like to control the surface condition.

As the lubricating material for use in the method in which image forming is conducted while a lubricating material is applied on the photoconductor surface, a material which hardly absorbs writing light and easily becomes fine powder or forms a film so as not to interfere with image forming is preferably used. Examples of the lubricating material include fluoroplastics such as polytetafluoroethylene, polyvinylidene fluoride and metallic soups of salts of a higher fatty acid with a metal other than alkali metals such as zinc and aluminum. Among those, metallic soaps and oils are preferred and, especially, zinc stearate is preferred because it is relatively easy to apply on the photoconductor surface in the shape of a film of fine particles.

The image forming method in which image forming is conducted while a lubricating material is applied on the photoconductor surface can maintain the surface conditions of the photoconductor throughout repeated image forming process and, therefore, is capable of producing a high-quality image free from image defects such as interference fringes, non-uniformity and formation of spots.

Figure 2:
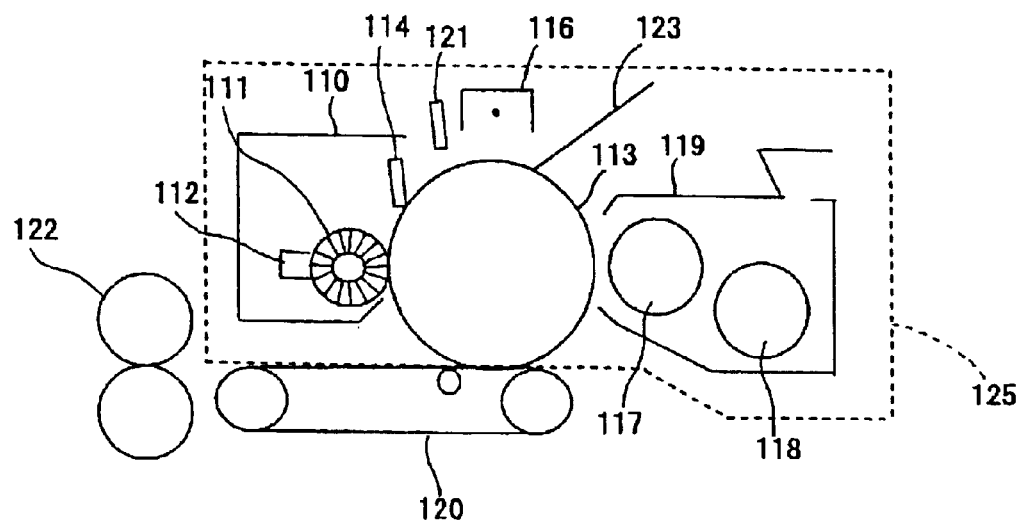
FIG. 2 is a schematic view showing an example of a process cartridge according to the present invention.

FIG. 2 shows an example of an image forming apparatus of the present invention, wherein a solid lubricant zinc stearate is used as a lubricating material. With the apparatus shown in FIG. 2, a surface of a photoconductor 113 is uniformly charged by a charger 116 while the photoconductor 113 is rotated in the direction of the arrow. Then, the photoconductor 113 is irradiated with image light 123 by exposure means (not shown) at an exposure section provided downstream of the charger 116. Thereby, electric charges at portions where the image light 123 was irradiated were lost and a latent image corresponding to the image light 123 is formed on the surface of the photoconductor 113.

At a downstream of the exposure section, a developing unit 119 as developing means is disposed and a toner as a developer is contained in the developing unit. The toner is agitated and triboelectrified to desired polarity by an agitator 118 and then transported to a nip part (developing area) between a developing roller 117 and the photoconductor 113 by the developing roller 117. The toner transported to the developing area is transferred from the surface of the developing roller 117 to the surface of the photoconductor 113 by developing electric field formed in the developing area by developing bias applying means (not shown) and adheres to the surface of the photoconductor 113 to develop an electrostatic latent image on the photoconductor 113 into a toner image (visible image).

The toner image formed on the photoconductor 113 is transferred to a transfer paper as a transfer member fed to a transfer section by paper supply means (not shown) by a nip part (transfer section) between a transfer and transport belt 120 as transferring means disposed in the vicinity of the photoconductor 113 and the photoconductor 113. The toner image formed on the transfer paper is fixed by a fixing roller 122 as fixing means disposed downstream of the rotating direction of the transfer and transport belt 120. Then, the transfer paper is discharged onto a discharge tray outside the apparatus body by paper discharge means (not shown).

Toner which is not transferred to the transfer paper at the transfer section and remained on the photoconductor 113 (residual toner) is removed from the photoconductor 113 by a cleaning brush 111 and a cleaning blade 114 of a cleaning unit 110 as cleaning means disposed downstream of the rotating direction of the photoconductor 113 in the transfer section. Residual charge remained on the photoconductor 113 after the cleaning of the remaining toner is eliminated by a discharger 121 comprising a discharge lamp and so on.

Figure 3:
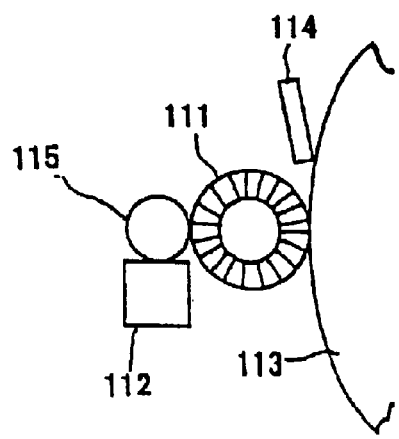
FIG. 3 is a schematic view showing an example of a process cartridge of the present invention provided with a lubricant applicator.

In such an image forming apparatus, it is effective to utilize the cleaning brush 111 of the cleaning unit 110 as zinc stearate applying means for applying zinc stearate to the surface of the photoconductor 113 in order to prevent enlargement of the apparatus and an increase in cost by providing the zinc stearate applying means. In the image forming apparatus of the present invention, a solid lubricant 112 of zinc stearate is provided in contact with the cleaning brush 111 of the cleaning unit 110 so that the zinc stearate may be applied to the surface of the photoconductor 113 by the cleaning brush 111. In the example shown in FIG. 2, a solid lubricant 112 is provided in direct contact with the cleaning brush 111. However, as shown in FIG. 3, the zinc stearate as the solid lubricant may be disposed in contact with an outer surface of an applying roller 115 disposed in contact with the cleaning brush 111 so that the zinc stearate may be supplied to the cleaning brush 111 via the applying roller 115.

In this image forming apparatus, a composition obtained by fusing and solidifying materials containing zinc stearate as a main component is used as a solid lubricant 112. The solid lubricant 112 is ground off as zinc stearate fine particles having a diameter of about 1 $\mu$m by brush fibers of the cleaning brush 111 and applied to the surface of the photoconductor 113 from the cleaning brush fibers. Thereafter, the fine particles of the solid lubricant 112 adhere to the photoconductor surface relatively strongly by an abutting pressure of the cleaning blade 114 onto the photoconductor 113. Considering developing efficiency, it is preferred that the amount of zinc stearate applied onto the photoconductor 113 be no larger than necessary.

Thus, this image forming apparatus is so constituted that the solid lubricant 112 is removable from the cleaning brush 111 by a removing mechanism (not shown) employing a solenoid. As the brush roller 111, a straight brush comprising 360 denier/24 filament carbon-containing acrylic fibers 124 and having a fiber density of 50000/in$^2$ and bristle length of about 5 mm. Use of a loop brush in which the brush fibers are loop-shaped as the cleaning brush 111 is not preferred because it grinds off the solid lubricant 112 excessively, so that too much zinc stearate is applied onto the photoconductor surface. The density and the thickness of the fibers of the cleaning brush 111 are so determined according to the linear velocity, diameter, material of the photoconductor and the materials of the solid lubricant 112 that the amount of zinc stearate is supplied to the photoconductor 113.

In the apparatus shown in FIG. 2, constituting units, such as the charger 116, photoconductor 113, light-exposing means, development unit 119, cleaning unit 110 and quenching unit 121 may be independently fixed in the image forming apparatus such as a copying machine, a facsimile machine, or a printer. Alternatively, at least one of those units may be incorporated in a process cartridge 125 as shown by the dotted line in FIG. 2. The process cartridge is generally a single part or device which is freely detachable from a body of the image forming apparatus and which comprises at least one means selected from a photoconductor, charging means, image exposure means, developing means, image transfer means, and cleaning means.

In order to form an image with high fidelity and high quality, the toner for use in the image forming apparatus of the present invention is desired to have an average particle size of not greater than 8 $\mu$m, preferably not greater than 7 $\mu$m, more preferably 1 to 6.5 $\mu$m. When the average particle size of the toner is not greater 8 $\mu$m, an image of excellent quality can be produced but the characteristics of the photoconductor are likely to be reflected in a printed image. Thus, an image produced with an image forming apparatus employing a conventional photoconductor is very apt to have interference fringes. However, an image produced with the image forming apparatus employing the photoconductor according to the present invention hardly has interference fringes.

The image forming apparatus of the present invention can produce a high-quality image free from interference fringes in single-color printing, multi-color printing and full-color printing. In color printing, it is required to reproduce an image with higher fidelity as compared with monochromatic printing. In color printing, an image is formed by superimposing color component images. Thus, when interference fringes occur, the characteristics of the photoconductor are superimposed on a printed image, causing a problem. However, the image forming apparatus employing the photoconductor according to the present invention can produce an image free from interference fringes also in color printing.

As a method of forming a color image using the image forming apparatus of the present invention, either a method comprising the steps of forming a plurality of images of different colors on photoconductors and transferring the toner images onto an output medium (a paper, in most cases) in succession, or a method comprising the steps of forming a plurality of images of different colors on photoconductors, laminating the toner images on a intermediate transfer member, and transferring the laminated toner image onto an output medium can be employed. However the image forming method using an intermediate transfer member, especially a method using an intermediate transfer belt as the intermediate transfer member, is preferred because it can provide improvement of image quality, prevention of color misalignment, enhancement of transfer efficiency and flexibility to output media when image density is high.

As the intermediate transfer belt, a belt made of fluoroplastics, a polycarbonate resin or a polyimide resin has been conventionally used but, in recent years, an elastic belt entirely of partially composed of an elastic material is spreading.

Transferring of a color image using a resin belt has a following problem. A color image is generally formed of four color toners. In one color image, first to fourth toner layers are formed. Since the toner layers receive pressure through a first transfer (transfer from a photoconductor to the intermediate transfer belt) and a secondary transfer (transfer from the intermediate transfer belt to a sheet), the aggregation force among toner particles is increased. When the aggregation force among toner particles is high, voids in letters and an edge void in a solid area are likely to occur.

A resin belt, which has high hardness and is not deformed according to toner layers, tends to compress toner layers and thus is likely to cause voids in letters. In recent years, a demand for printing on various types of paper such as a Japanese paper and a paper embossed on purpose is increasing. However, a paper of low smoothness is apt to have a gap between itself and the toner layers, so that an image printed thereon is likely to have a transfer void. When a transfer pressure in the secondary transfer process is increased to enhance the adhesion of toner to the paper, the aggregation force among toner particles is increased, causing voids in letters as above.

Thus, an elastic belt is suitable for the intermediate transfer belt. An elastic, belt has lower hardness than a resin belt and thus is deformed according to toner layers and a paper of low smoothness in a transfer unit. Namely, the elastic belt is deformed following regional irregularity and enhances the adhesion of toners without unnecessarily increasing the transfer pressure onto the toner layers, so that an image with high uniformity and free from voids in letters can be produced even on a paper of low smoothness. When a toner image formed on the intermediate transfer belt has a thickness of over 30 μm, a printed image formed using an inelastic intermediate belt is likely to have white voids. However, an elastic intermediate transfer can produce a high-quality image free from such problems.

Examples of resins for use in production of the elastic belt include and are not limited to polycarbonate; fluororesin (ETFE, PVDF); styrene resins (homopolymers and copolymers containing styrene or a styrene homologue) such as polystyrene, chloropolystyrene, poly-α-methylstyrene, styrene-butadiene copolymer, styrene-vinyl chloride copolymer, styrene-vinyl acetate copolymer, styrene-maleic acid copolymer, styrene-acrylic ester copolymers (styrene-methyl acrylate copolymer, styrene-ethyl acrylate copolymer, styrene-butyl acrylate copolymer, styrene-octyl acrylate copolymer and styrene-phenyl acrylate copolymer, etc.), styrene-methacrylic ester copolymers (styrene-methyl methacrylate copolymer, styrene-ethyl methacrylate copolymer, styrene-phenyl methacrylate copolymer, etc.), styrene-α-methyl chloroacrylate copolymer, and styrene-acrylonitrile-acrylic ester copolymers; methyl methacrylate resins; butyl methacrylate resins; ethyl acrylate resins; butyl acrylate resins; modified acrylic resins (silicone-modified acrylic resin, vinyl chloride resins modified acrylic resins, acrylic-urethane resins, etc.); vinyl chloride resins, styrene-vinyl acetate copolymer, vinyl chloride-vinyl acetate copolymer, rosin-modified maleic acid resins, phenol resins, epoxy resins, polyester resins, polyester polyurethane resins, polyethylene, polypropylene, polybutadiene, polyvinylidene chloride, ionomer resins, polyurethane resins, silicone resins, ketone resins, ethylene-ethyl acrylate copolymer, xylene resins, polyvinyl butyral resins, polyamide resins, and modified polyphenylene oxide resins. The resins may be used alone or in combination.

Examples of rubbers and elastomers for use in the elastic belt include and are not limited to butyl rubber, fluoro rubbers, acrylic rubbers, EPDM, NBR, acrylonitrile-butadiene-styrene rubber natural rubber, isoprene rubber, styrene-butadiene rubber, butadiene rubber, ethylene-propylene rubber, ethylene-propylene terpolymers, chloroprene rubber, chlorosulfonated polyethylene, chlorinated polyethylene, urethane rubber, syndiotactic 1,2-polybutadiene, epichlorohydrin rubbers, silicone rubbers, fluororubbers, polysulfide rubbers, polynorbornene rubber, hydrogenated nitrile rubber, and thermoplastic elastomers (e.g., polystyrene type, polyolefin type, polyvinyl chloride type, polyurethane type, polyamide type, polyurea, polyester type and fluorine resin type). The rubbers and the elastomers may be used alone or in combination.

A resistance adjusting conductive material, which may be added to the intermediate transfer member as necessary, is not specifically limited. Examples of the resistance adjusting conductive material include and are not limited to carbon black, graphite, a powder of metal such as aluminum and nickel, a conductive metal oxide such as tin oxide, titanium oxide, antimony oxide, indium oxide, potassium titanate, antimony-tin double oxide (ATO) and indium-tin double oxide (ITO). The conductive metal oxide may be coated with non-conductive fine particles such as barium sulfate fine particles, magnesium silicate fine particles and calcium carbonate fine particles.

The material for forming a surface layer of the intermediate transfer member is not specifically limited as long as it reduces adhesion of the toner to the surface of the intermediate transfer belt to enhance secondary transferability thereof. For example, the surface layer may be composed of a resin such as polyurethane resins, polyester resins and epoxy resins or a mixture thereof in which a powder or particles, or a mixture of powders or particles with different diameter, of a material which reduces surface energy and enhances lubricity such as fluoroplastics, fluorine compounds, carbon fluoride, titanium dioxide and silicon carbide or a mixture thereof are dispersed. A fluoro rubber on which a fluorine-rich layer is formed by heat treatment to reduce surface energy may be also used.

The method of producing the belt is not specifically limited. Examples of the belt producing method include and are not limited to a centrifugal molding method in which the material is poured into a rotating cylindrical mold, a spray coating method in which a thin film is formed on a surface of a mold, a dipping method in which a cylindrical mold is immersed in a material solution and drawn up, an injection molding method in which the material is pored between inner and outer molds, and a method in which a surface of a compound wound on a cylindrical mold is vulcanized and polished. The methods may be employed in combination.

Examples of methods of preventing elongation of the elastic belt include but are not limited to a method in which a rubber layer is formed on a core resin layer and a method in which a material which can prevent the elongation is added in a core layer.

Examples of materials for use in forming the core layer for preventing elongation of the elastic belt include and are not limited to natural fibers such as cotton, silk; synthetic fibers such as polyester fibers, nylon fibers, acrylic fibers, polyolefin fibers, polyvinyl alcohol fibers, polyvinyl chloride fibers, polyvinylidene chloride fibers, polyurethane fibers, polyacetal fibers, polyfluoroethylene fibers, phenol fibers; inorganic fibers such as carbon fibers, glass fibers, boron fibers; and metal fibers such as iron fibers and copper fibers. The materials may be used in the form of a woven fabric or threads and used in alone or in combination.

The thread may be of one filament or a strand of filaments, or may be a single twisted yarn, plied yarn or two-ply yarn. A plurality of types of fibers selected from the above group may be mixed. The strand threads may be subjected to suitable conductive treatment.

The woven fabric may be woven in any method, for example, by knitting, and a union fabric can be also used. The woven fabric may be subjected to conductive treatment.

The method for providing a core layer is not specifically limited. Examples of the core layer providing method include a method in which a cover layer is formed on a fabric woven into a cylindrical shape and laid on a mold or the like, a method in which a woven fabric woven into a cylindrical shape is immersed in a liquid rubber or the like to form a cover layer on one or both sides thereof, and a method in which a coating layer is formed on a thread helically wound on a mold or the like at a given pitch.

When the thickness of the elastic layer is excessively large (about 1 mm or larger), the surface thereof expands and contracts so largely as to generate cracks therein or deformation of a printed image, although it depends on the hardness thereof.

The elastic layer preferably has a hardness in a range of 10 to 65° (JIS-A), although the hardness must be adjusted according to the thickness of the belt. A belt having a hardness (JIS-A) of less than 10° is very difficult to form with dimensional accuracy. This is because the belt is likely to be subjected to contract or expansion. In order to soften a belt, an oil component is frequently added in the support. However, when the belt is continuously used under pressure, the oil component bleeds out and contaminates the photoconductor in contact with the surface of the intermediate transfer member, causing streaks in a lateral direction in a printed image.

In general, an intermediate transfer belt is provided with a surface layer to improve releasing property thereof. In order to prevent the oil component from bleeding out completely, the surface layer is required to be excellent in quality, in durability, for example, so that it is difficult to select the material therefor and to ensure properties required thereto. On the other hand, an elastic layer having a hardness (JIS-A) of at least 65° has sufficient hardness and thus can be formed with accuracy. Also, the elastic layer can be formed with a small amount of oil component or without oil component, so that the contamination of the photoconductor by the oil can be reduced. However, the elastic layer cannot provide an effect of improving toner transferability and makes it difficult to train the intermediate transfer belt over rollers.

Image forming method employable in the image forming apparatus of the present invention include a method in which toner images of different colors are formed on a single photoconductor and transferred on an output medium or an intermediate transfer member in succession and a tandem method in which toner images of different colors are formed on a plurality of photoconductors, respectively, and transferred onto an output medium or an intermediate transfer member. In order to respond to needs for high-speed image forming, it is preferable to use a plurality of photoconductors. Especially, in order to form a high-quality image, tandem type indirect transfer method is highly preferred in which toner images of different colors are formed on a plurality of photoconductors and transferred onto an elastic intermediate transfer belt, and then the laminated toner image is secondarily transferred onto an output medium.

In a tandem type image forming apparatus, toner images of are formed on a plurality of photoconductors, so that the I(S) of each of the photoconductors must be in the range herein shown. Otherwise, an unnatural printed image with interference fringes of a specific color is produced.

Figure 4:
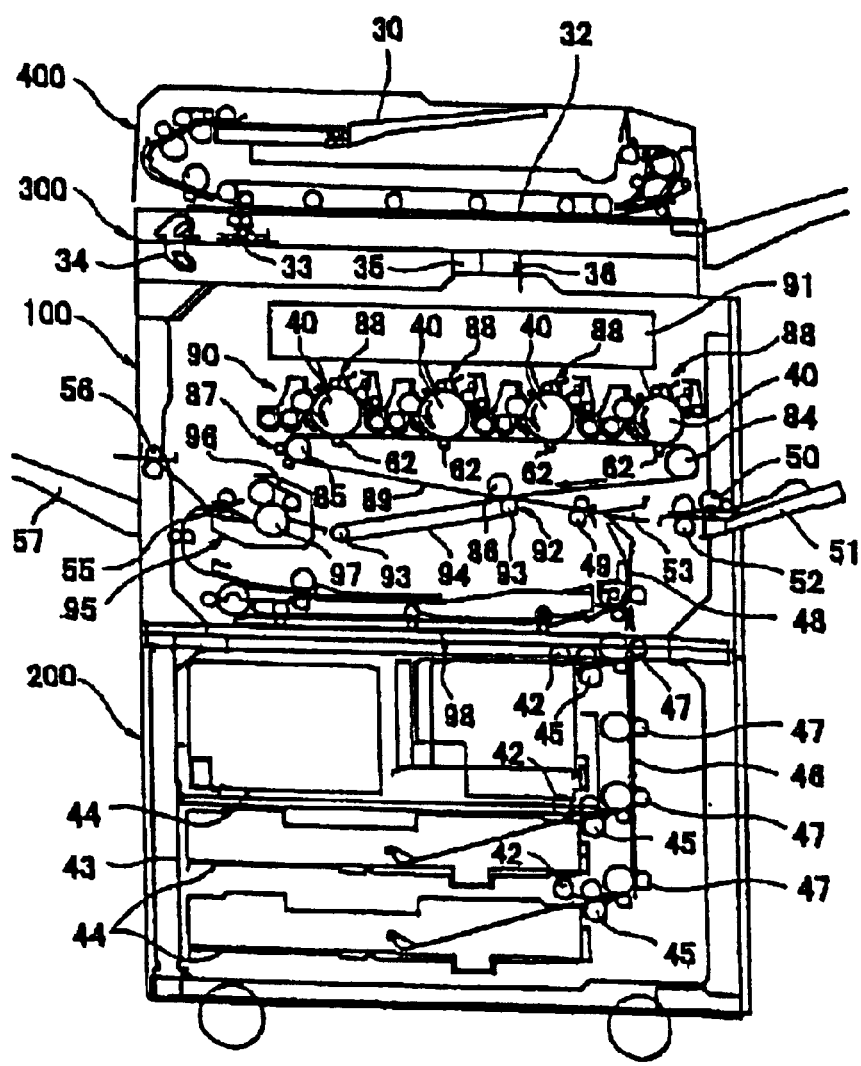
FIG. 4 is a schematic view showing an image forming apparatus according to the present invention.

FIG. 4 shows a tandem-type color image forming apparatus employing an indirect transfer system.

In FIG. 4, designated as 100 is a copying machine main body, as 200 is a sheet supply table on which the copying machine main body 100 is mounted, as 300 is a scanner mounted on the copying machine main body 100, as 400 is an automatic draft feeder (ADF) mounted on the scanner 300.

The copying machine main body 100 is equipped with an endless belt type intermediate transfer member 89 in a center part thereof.

With the apparatus shown in FIG. 4, the intermediate transfer member 89 is trained over first, second and third support rollers 84, 85 and 86 so as to be able to rotationally transport a sheet in a clockwise direction as seen in FIG. 4.

In the illustrated example, an intermediate transfer member cleaning unit 87 is provided on the left side of the second support roller 85 for removing residual toner remaining on the intermediate transfer member 89 after transfer of an image.

Above a portion of the intermediate transfer member 89 extending between the support rollers 84 and 85, four image forming means 88 for forming black, yellow, magenta and cyan images, respectively, are disposed in a row along the transporting direction of the intermediate transfer member 89, thereby constituting a tandem image forming unit 90. Above the tandem image forming unit 90 is provided an exposure unit 91 as shown in FIG. 6.

On the other side of the tandem image forming unit 90 with respect to the intermediate transfer member 89 is disposed a secondary transfer unit 92 for transferring an image on the intermediate transfer member 89 to a sheet. The secondary transfer unit 92 comprises two rollers 93 and an endless secondary transfer belt 94 trained between the rollers 93 and disposed in pressure contact with the third support roller 86 with the intermediate transfer member 89 interposed therebetween.

A fixing unit 95 for fixing an image transferred onto a sheet is disposed on one side of the secondary transfer unit 92. The fixing unit 95 comprises an endless fixing belt 96 and a pressure roller 97 disposed in pressure contact with the fixing belt 96.

The secondary transfer unit 92 also has a function of transporting a sheet on which an image has been transferred to the fixing unit 95. As the secondary transfer unit 92, a transfer roller or non-contact charger may be provided. In such a case, it is difficult for the secondary transfer unit 92 to have the sheet transporting function.

In the illustrated example, a sheet reversing unit 98 for reversing a sheet to perform double-side printing is disposed below the secondary transfer unit 92 and the fixing unit 95 and in parallel to the tandem image forming unit 90.

When a copy is produced with the color electrophotographic apparatus, a draft is placed on a draft table 30 of the automatic draft feeder 400, or the automatic draft feeder 400 is opened and a draft is placed on a contact glass 32 of the scanner 300 and the automatic draft feeder 400 is closed to hold the draft therewith.

When a start switch (not shown) is pressed, the scanner 300 is actuated to drive a first running body 33 and a second running body 34 after the draft has been transferred onto the contact glass 32 in the case where the draft was placed on the automatic draft feeder 400, or immediately in the case where the draft is placed on a contact glass 32. The first running body 33 emits light from a light source thereof to the draft surface. Light reflected on the draft surface is reflected by the first running body 33 to the second running body 34, reflected on a mirror thereof and inputted into a read sensor 36 through an image forming lens 35, whereby the draft is read.

When the start switch (not shown) is pressed, one of the rollers 84, 85 and 86 is rotated by a driving motor (not shown). Thereby, the other two rollers are driven to rotate the intermediate transfer member 89. At the same time, photoconductors 40 of the image forming means 88 are rotated and single color images of black, yellow, magenta and cyan are formed on each of the photoconductors 40. Along with the rotation of the intermediate transfer member 89, the single color images are transferred thereonto in succession, thereby forming a superimposed color image on the intermediate transfer member 89.

At the same time, one of sheet supply rollers 42 in the sheet supply table 200 is selected and driven to feed out sheets from one of sheet supply cassettes arranged in a multistage form in a paper bank 43. The sheets are separated one by one by a separation roller 45. The separated sheet is fed into a sheet supply passage 46, transferred by a transport roller 47 through a sheet supply passage 48 until coming into contact with a resist roller 49. Or, a sheet supply roller 50 is rotated to feed sheets on a manual feeding tray 51 into the copying machine main body 100. The sheets are separated one by one by a separation roller 52. The separated sheet is fed through a manual feeding passage 53 until coming into contact with a resist roller 49.

Then, the resist roller 49 is rotated in a synchronized relationship with the superimposed color image on the intermediate transfer member 89 and the sheet is fed between the intermediate transfer member 89 and the secondary transfer unit 92, whereby the superimposed color image is transferred onto the sheet by the secondary transfer unit 92.

The sheet on which the image has been transferred is transported by the secondary transfer unit 92 to the fixing unit 95, where the transferred image is fixed by applying heat and pressure thereon. Then, the sheet discharged by a discharge roller 56 and stacked on a discharge tray 57 or fed into the sheet reversing unit 98. The transporting directions are switched by a switching claw 55. The sheet fed into the sheet reversing unit 98 is reversed therein, introduced to the transfer position again, where an image is also formed on the reverse side of the sheet. Then, the sheet is discharged onto the discharge tray 57 by the discharge roller 56

After transfer of the image, residual toner remaining on the intermediate transfer member 89 was removed by the intermediate transfer member cleaning unit 87 in preparation for the next image forming by the tandem image forming unit 90.

The resist roller 49 is usually earthed but may be applied with a bias to remove paper powder on sheets. In an intermediate transfer system, paper powder is not likely to be transported to photoconductors and thus does not have to be taken into consideration. Thus, the resist roller 49 may be earthed.

As the applied voltage, a DC bias is applied, but it may be an AC voltage having a DC offset component to electrify the sheet more uniformly.

The surfaces of the sheet passed through the resist roller 49 applied with bias is slightly negatively charged. Thus, the conditions in transferring of an image from the intermediate transfer member 89 to a sheet must be changed from those in the case where no voltage is applied to the resist roller 49.

In the above tandem image forming apparatus 90, each of the image forming means 88 comprises, as shown in FIG. 7, the drum shaped photoconductor 40, and a charging unit 60, a fixing unit 61, a first transfer unit 62, a photoconductor cleaning unit 63, a discharge unit 64 and so on, which are provided around the photoconductor 40.

The following examples will further illustrate the present invention. Parts are by weight.

EXAMPLES 1 To 3 AND COMPARATIVE EXAMPLE 1

An aluminum drum was subjected to a surface roughening treatment by cutting with a diamond flat cutting tool to obtain surface roughened drum having a diameter of 90 mm, a length of 352 mm and a thickness of 2.5 mm. 15 Parts of an acrylic resin (Acrydic A-460-60, made by Dainippon Ink & Chemicals, Inc.) and 10 parts of a melamine resin (Super Beckamine L-121-60, made by Dainippon Ink & Chemicals, Inc.) were dissolved in 80 parts of methyl ethyl ketone. To the solution was added 90 parts of a titanium oxide powder (TM-1, made by Fuji Titanium Industry Co., Ltd.). The mixture was dispersed in a ball mill for 72 hours to prepare a coating liquid for an undercoat layer. The above aluminum drum was immersed in the undercoat layer coating liquid and then vertically drawn up at a constant rate to coat the drum with the coating liquid. The aluminum drum was moved to a drying room with its attitude maintained and dried therein at 140° C. for 20 minutes to form an undercoat layer having a thickness of 2.0 μm thereon.

15 Parts of a butyral resin (S-LEC BLS, made by Sekisui Chemical Co., Ltd.) were dissolved in 150 parts of cyclohexanone. To the solution were added 10 parts of a tris-azo pigment having a structure represented by the following structural formula (1). This was then dispersed in a ball mill for 60 hours.

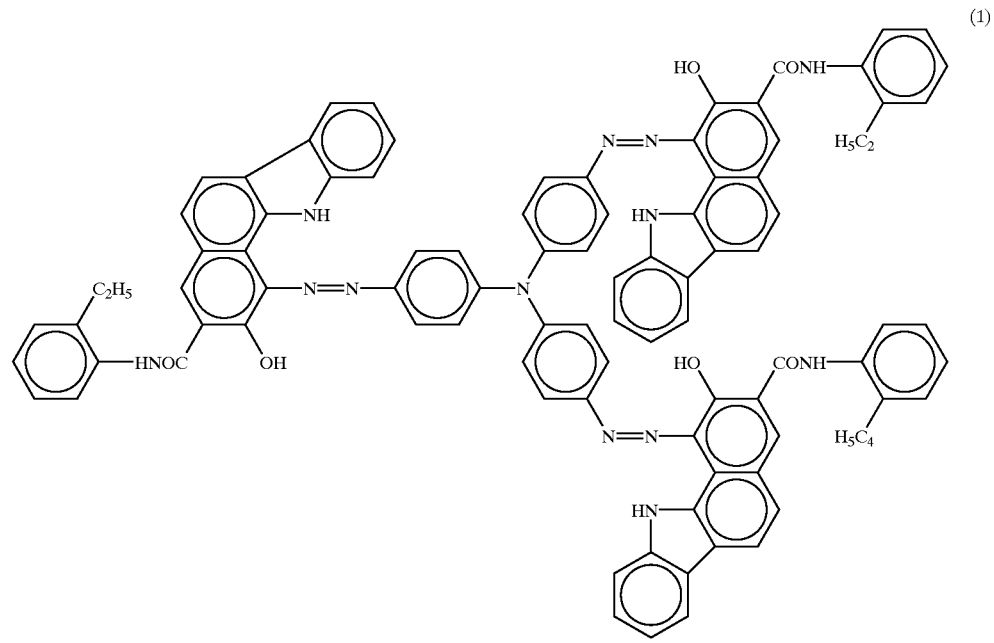

(1)

To the dispersion were added 210 parts of cyclohexanone. This was dispersed for 5 hours and then diluted with cyclohexanone with stirring such that the solid content was 1.5% by weight, thereby obtaining a coating liquid for a charge generating layer. The aluminum drum on which the undercoat layer had been formed was immersed in the charge generating layer coating liquid to coat the drum with the coating liquid and then dried as in the case of the undercoat layer at 120° C. for 20 minutes to form a charge generating layer having a thickness of about 0.2 μm.

The aluminum drum on which the undercoat layer and the charge generating layer had been formed was then immersed in a coating liquid for a charge transporting layer obtained by dissolving 6 parts of a charge transporting material having a structure represented by the following structural formula (2), 10 parts of a polycarbonate resin (Panlite K-1300, made by Teijin Chemicals, Ltd.), 0.002 parts of a silicone oil (KF-50, made by Shin-Etsu Chemical Co., Ltd.) in 90 parts of methylene chloride.

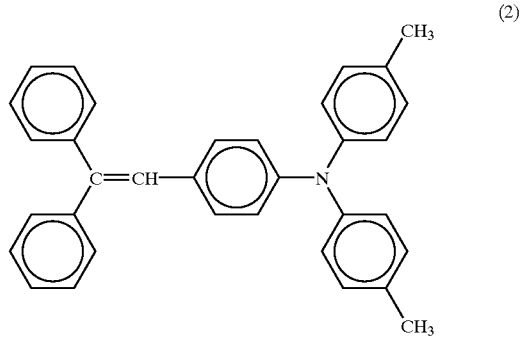

(2)

The aluminum drum was drawn up at a constant rate, whereby a charge transporting layer having an average thickness of about 23 μm was formed on the charge generating layer.

The surfaces of three of the four photoconductors thus obtained were wrapped with a wrapping tape (C-2000, made by Fuji Photo Film Co., Ltd.) for 50 seconds, 100 seconds and 150 seconds, respectively, thereby obtaining photoconductors of Examples 1 to 3. The remaining one whose surface was not wrapped was designated as Comparative Example 1.

The surface of each of the thus obtained photoconductors was measured for a sectional curve using a surface roughness meter (Surfcom 1400A, made by Tokyo Seimitsu K.K.) through a length of 5 mm along the axial direction. From the sectional curve, the maximum height in each of regions having a predetermined length along the X-axis of 70 μm was obtained. The smallest value Hm of the maximum heights thus obtained is shown in Table 1.

Each of the photoconductors was incorporated in a copying machine (Imagio Color 2800 made by Ricoh Company, Ltd.; wavelength of writing light: 780 nm, resolution of image writing: 400 dpi, diameter of writing light beam spot: 70 μm) employing a 12-level halftone reproduction system by combination of pulse width modulation and power modulation, and a uniform black-and-white halftone image was produced. The results are summarized in Table 1. The refractive index of the photoconductive layer at the wavelength of 780 nm was 1.85 and, therefore, the required maximum height λ/2n was 0.21 μm (0.78/(2×1.85)).

TABLE 1

| | Hm (μm) | Black-and-white halftone image |
|---|---|---|
| Ex. 1 | 0.23 | Uniform. No image defects. |
| Ex. 2 | 0.25 | Uniform. No image defects. |
| Ex. 3 | 0.27 | Uniform. No image defects. |

TABLE 1-continued

|  | Hm (μm) | Black-and-white halftone image |
|---|---|---|
| Comp. Ex. 1 | 0.06 | Interference fringes like wood grain were observed at a center part of the image. | was moved to a drying room with its attitude maintained and dried therein at 140° C. for 20 minutes to form an undercoat layer having a thickness of 6.5 μm thereon.

2 Parts of a polyvinyl butyral resin (XYHL, made by Union Carbide Corp.) were dissolved in 200 parts of methyl ethyl ketone. To the solution were added 10 parts of a bisazo pigment having a structure represented by the following structural formula (3). This was then dispersed in a ball mill for 340 hours.

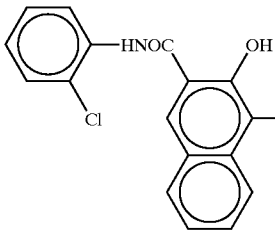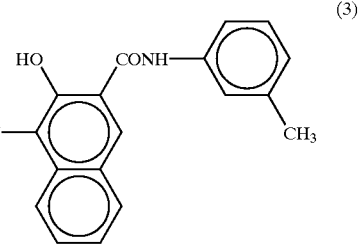

(3)

EXAMPLES 4 AND 5 AND COMPARATIVE EXAMPLE 2

Using the photoconductors obtained in Examples 1 to 3, a halftone image was printed out in the same manner as that in Examples 1 to 3 except that the copying machine (Imagio Color 2800) was modified such that the diameter of the writing light beam spot was changed to 57 μm. The results are summarized in Table 2.

TABLE 2

|  | Photoconductor | HM (μm) | Black-and-white halftone image |
|---|---|---|---|
| Ex. 4 | Example 2 | 0.22 | Uniform. No image defects. |
| Ex. 5 | Example 3 | 0.24 | Uniform. No image defects. |
| Comp. Ex. 2 | Example 1 | 0.20 | Four sets of interference fringes were observed. |

EXAMPLE 6

3 Parts of an alkyd resin (Bekkozol 1307–60-EL, made by Dainippon Ink & Chemicals, Inc.), 2 parts of a melamine resin (Super Bekkamin G-821-60, made by Dainippon Ink & Chemicals, Inc.) were dissolved in 100 parts of methyl ethyl ketone. To the solution were added 20 parts of a titanium oxide powder (CR-EL made by Ishihara Sangyo Kaisha, Ltd.). The mixture was dispersed in a ball mill for 200 hours to prepare a coating liquid for an undercoat layer.

An aluminum drum (without roughening treatment) having a diameter of 30 mm, a length of 340 mm and a thickness of about 0.75 mm was immersed in the undercoat layer coating liquid and then vertically drawn up at a constant rate to coat the drum with the coating liquid. The aluminum drum To the dispersion were added 200 parts of cyclohexanone. This was dispersed for 1 hour and then diluted with cyclohexanone with stirring such that the solid content was 1.5% by weight, thereby obtaining a coating liquid for a charge generating layer. The aluminum drum on which the undercoat layer had been formed was immersed in the charge generating layer coating liquid to coat the drum with the coating liquid and then dried as in the case of the undercoat layer at 120° C. for 20 minutes to form a charge generating layer having a thickness of about 0.2 μm.

1 Part of a charge transporting material having a structure represented by the following structural formula (4), 1 part of a bisphenol Z type polycarbonate and 0.04 part of a silicone oil (KF-50 made by Shin-Etsu Chemical Co., Ltd.) were dissolved in 8 parts of tetrahydrofuran, thereby obtaining a coating liquid for a charge transporting layer. The aluminum drum on which the undercoat layer and the charge generating layer had been formed was immersed in the charge transporting layer coating liquid to coat the drum with the coating liquid and dried as in the case of the undercoat layer at 120° C. for 20 minutes to form a charge transporting layer having a thickness of about 23 μm on the charge generating layer.

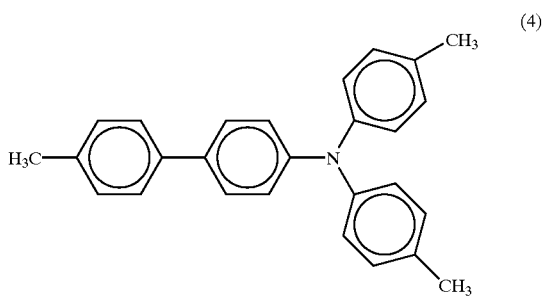

(4)

3 Parts of the above charge transporting material, 3 parts of an aluminum oxide powder having a purity of 4N and an average particle size of 0.3 μm and 4 parts of a bisphenol Z type polycarbonate were dissolved in 50 parts of cyclohexanone. The solution was dispersed for 24 hours, then diluted with tetrahydrofuran such that the solid content was 5% by weight and further dispersed. The dispersion was coated over the charge transporting layer by a ring coating method and dried at 145° C. for 20 minutes to form an uppermost layer having a thickness of about 3.5 µm.

The surface of each of the thus obtained photoconductors was measured for a sectional curve using a surface roughness meter (Surfcom 1400A, made by Tokyo Seimitsu K.K.) through a length of 5 mm. From the sectional curve, the maximum height in each of regions having a predetermined length along the X-axis of 60 µm was obtained. The smallest value Hm of the maximum heights thus obtained was 0.19 µm.

The photoconductors was incorporated in a copying machine (Imagio Color 2200 made by Ricoh Company, Ltd.; wavelength of writing light: 655 nm, resolution of image writing resolution: 600 dpi, modified diameter of writing light beam spot: 60 µm), and a uniform black-and-white halftone image was produced. A black-and-white halftone image free from image defects such as interference fringes was able to be obtained. The refractive index of the photoconductive layer at the wavelength of 655 nm was 1.97 and, therefore, the required maximum height λ/2n was 0.17 µm (0.655/(2×1.97)).

EXAMPLES 7 TO 9 AND COMPARATIVE EXAMPLES 3 AND 4

Four photoconductors were prepared in the same manner as in example 6 except that the average particle size of the aluminum oxide powder for use in forming the outermost layer was changed to 0.4 µm, 0.5 µm, 0.7 µm and 0.07 µm, respectively. A photoconductor was also prepared in the same manner as in example 6 except that no aluminum oxide powder was used. The surface of each of the thus obtained photoconductors was measured for a sectional curve using a surface roughness meter (Surfcom 1400A, made by Tokyo Seimitsu K.K.) through a length of 5 mm. From the sectional curve, the maximum height in each of regions having a predetermined length along the X-axis of 60 µm was obtained. The smallest value Hm of the maximum heights thus obtained was as shown in Table 3.

The photoconductors was incorporated in a copying machine (Imagio Color 2200 made by Ricoh Company, Ltd.; wavelength of writing light: 655 nm, resolution of image writing resolution: 600 dpi, modified diameter of writing light beam spot: 60 µm), and a uniform black-and-white halftone image was produced to give the results shown in Table 3. The refractive index of the photoconductive layer at the wavelength of 655 nm was 1.97 and, therefore, the required maximum height k/2n was 0.17 µm (0.655/(2× 1.97)).

TABLE 3

| | Average diameter of alumina (µm) | Hm (µm) | Black-and-white halftone image |
|---|---|---|---|
| Ex. 7 | 0.4 | 0.20 | Uniform. No image defects. |
| Ex. 8 | 0.5 | 0.23 | Uniform. No image defects. |
| Ex. 9 | 0.7 | 0.25 | Uniform. No image defects. |
| Comp. Ex. 3 | 0.07 | 0.16 | Three sets of interference fringes were observed. |
| Comp. Ex. 4 | no alumina was used | 0.09 | light and shade spots with a diameter of 5 to 20 mm were observed in whole area. |

EXAMPLE 10

Using the photoconductor obtained in Example 6, image formation was continuously performed for obtaining 600,000 copies with the copying machine as used in Example 6. Thereafter, a uniform black-and-white halftone image was outputted. A uniform halftone image free of image defects such as interference fringes was obtained. A central part of the photoconductor was then measured for a sectional curve using a surface roughness meter (Surfcom 1400A, made by Tokyo Seimitsu K.K.) through a length of 5 mm. From the sectional curve, the maximum height in each of regions having a predetermined length along the X-axis of 60 µm was obtained. The smallest value Hm of the maximum heights was 0.20 µm.

EXAMPLE 11

The following composition was placed in a ball mill pot together with alumina balls with a diameter of 10 mm and was milled for 72 hours.

| | |
|---|---|
| Titanium oxide (CR-60, manufactured by Ishihara Sangyo Co., Ltd.) | 50.0 parts |
| Alkyd resin (Bekkolite M6401-50 manufactured by Dainippon Ink & Chemicals, Inc.) | 15.0 parts |
| Malamine resin (Super Beckamine L-121-60, manufactured by Dainippon Ink & Chemicals, Inc.) | 10.0 parts |
| Methyl ethyl ketone | 31.7 parts |

The above milled mixture was further mixed with 105.0 parts of cyclohexanone and milled in the ball mill for 12 hours to obtain a coating liquid for an undercoat layer. The coating liquid was applied by spray coating to a surface of a seamless, endless nickel belt (Vikaas hardness: 480 to 510, purity: more than 99.2) having a peripheral length of 290.3 mm and a thickness of 30 µm, and the coating was dried at 135° C. for 25 minutes to form an undercoat layer having a thickness of 6.0 µm.

1.5 Parts of a polyvinylbutyral resin (S-LEC BLS, made by Sekisui Chemical Co., Ltd.), 1.5 parts of a charge generating material having a structure shown by the formula (5), 1.5 parts of a charge generating material having a structure shown by the formula (6) and 80.0 parts of cyclohexanone were placed in a ball mill pot together with alumina balls with a diameter of 10 mm and was milled for 72 hours. The milled mixture was further mixed with 78.4 parts of cyclohexane and 237.6 parts of methyl ethyl ketone to obtain a coating liquid for forming a charge generating layer.

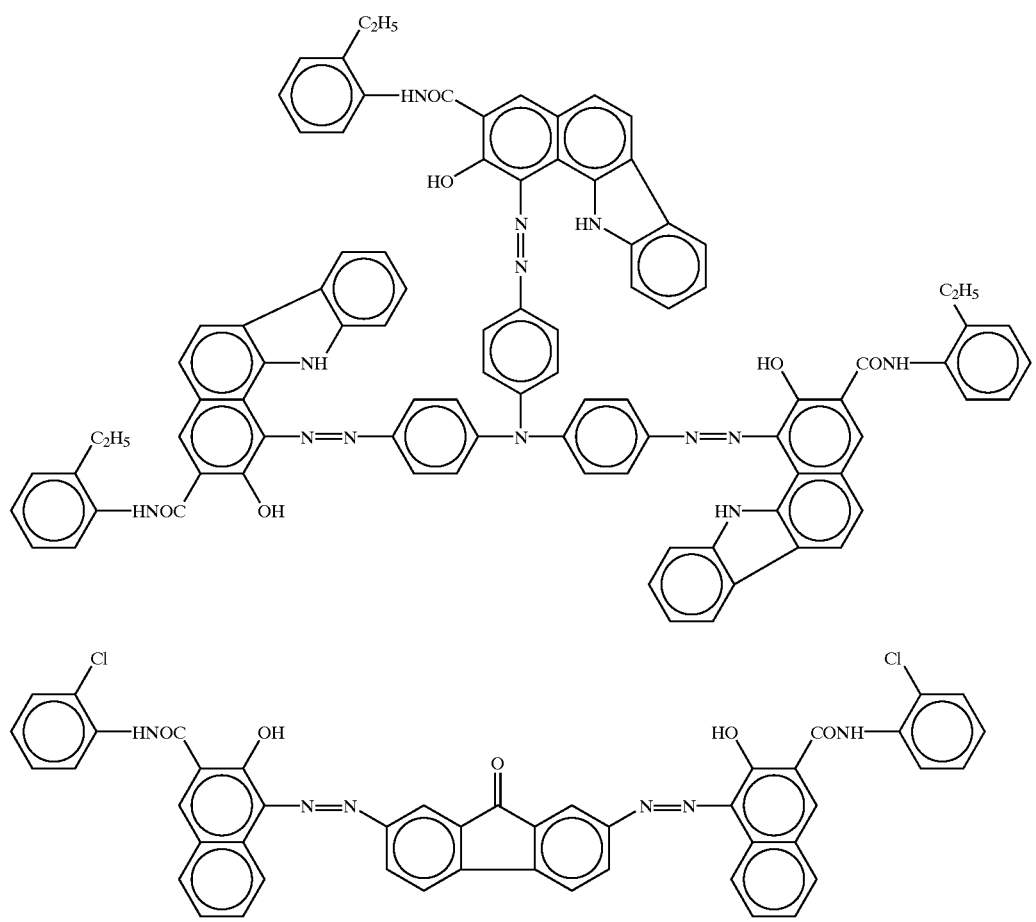

(5)

(6)

The charge generating layer coating liquid was then applied by spray coating to the undercoat layer formed on the belt and dried at 130° C. for 20 minutes to form a charge generating layer having a thickness of 0.12 μm.

A coating liquid having the following composition for a charge transporting layer was prepared.

| | |
|---|---|
| Charge transporting material of structural formula (7) shown below (manufactured by Ricoh Company, Ltd.) | 7 parts |
| Polycarbonate resin (C-1400, manufactued by Teijin Chemicals, Ltd.) | 10 parts |
| Silicone oil (KF-50, manufactured by Shin-Etsu Chemical Co., Ltd.) | 0.002 part |
| Tetrahydrofuran | 841.5 parts |
| Cyclohexanone | 841.5 parts |
| 3-t-Butyl-4-hydroxyanisol | 0.04 part |

(7)

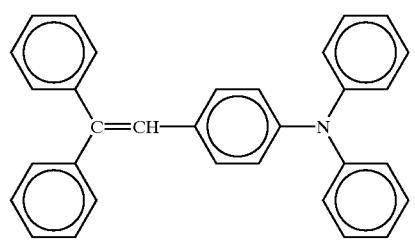

The above coating liquid was applied by spray coating on the charge generating layer and the coating was dried at 140° C. for 30 minutes to form a charge transporting layer having a thickness of 25 μm. The resulting belt was cut into a width of 367 mm.

A coating liquid for forming an uppermost layer was prepared by dispersing 3 parts of the charge transporting material of the above formula (7) and 3 parts of aluminum oxide (purity: 4N, average particle diameter: 0.3 μm) in 50 parts of cyclohexanone in which 4 parts of bisphenol Z polycarbonate resin had been dissolved. After 24 hour dispersing operation, the dispersion was diluted with tetrahydrofuran to obtain the coating liquid having a solid matter content of 5% by weight. The coating liquid was then applied by spray coating onto the charge transporting layer and the coating was dried at 145° C. for 20 minutes to form an uppermost layer having a thickness of about 3.5 μm, thereby obtaining a photoconductor in the form of an endless belt.

A central part of the photoconductor belt was then measured for a sectional curve using a surface roughness meter (Surfcom 1400A, made by Tokyo Seimitsu K.K.) through a length of 5 mm in the lateral direction. From the sectional curve, the maximum height in each of regions having a predetermined length along the X-axis of 55 μm was obtained. The smallest value Hm of the maximum heights was 0.21 μm.

The refractive index of the photoconductive layer at the wavelength of 655 nm was 1.97 and, therefore, the required maximum height λ/2n was 0.17 μm (0.655/(2×1.97)).

Two strips of an urethane rubber (DUS-216-70A, manufactured by Sedum Inc., rubber hardness: 70) having a thickness of 0.8 mm were bonded with an acrylate adhesive to both side end regions of the inside surface of the photoconductor belt to form guides for preventing lateral movement of the belt. The photoconductor belt was then incorporated in a copying machine (IPSIO Color 5000 made by Ricoh Company, Ltd.; wavelength of writing light: 655 nm, diameter of writing light beam spot: 55 μm), and a uniform black-and-white halftone image was outputted. A high grade halftone image free of image defects such as interference fringes was obtained.

EXAMPLE 12

The photoconductor belt obtained in Example 11 and having lateral movement preventing guides was incorporated into the copying machine having the same construction as that of Example 11 except that the diameter of the writing light beam spot was changed to 49 μm. A central part of the photoconductor belt was then measured for a sectional curve using a surface roughness meter (Surfcom 1400A, made by Tokyo Seimitsu K.K.) through a length of 5 mm. From the sectional curve, the maximum height in each of regions having a predetermined length along the X-axis of 49 μm was obtained. The smallest value Hm of the maximum heights was 0.18 μm. Image formation was continuously performed for obtaining 150,000 copies with the copying machine. Thereafter, a uniform black-and-white halftone image was outputted. A uniform halftone image free of image defects such as interference fringes was obtained. A central part of the photoconductor was again measured for a sectional curve using a surface roughness meter through a length of 5 mm. From the sectional curve, the maximum height in each of regions having a predetermined length along the X-axis of 49 μm was obtained. The smallest value Hm of the maximum heights was 0.18 μm.

EXAMPLE 13

An aluminum drum was subjected to a surface roughening treatment by cutting with a diamond flat cutting tool to obtain surface roughened drum having a diameter of 60 mm, a length of 352 mm and a thickness of 2.0 mm. 3 Parts of an alkyd resin (Bekkozol 1307-60-EL, made by Dainippon Ink & Chemicals, Inc.) and 2 parts of a melamine resin (Super Beckamine G-821-60, made by Dainippon Ink & Chemicals, Inc.) were dissolved in 100 parts of methyl ethyl ketone. To the solution was added 20 parts of a titanium oxide powder (CR-EL, made by Ishihara Sangyo Co., Ltd.). The mixture was dispersed in a ball mill for 200 hours to prepare a coating liquid for an undercoat layer. The above aluminum drum was immersed in the undercoat layer coating liquid and then vertically drawn up at a constant rate to coat the drum with the coating liquid. The aluminum drum was moved to a drying room with its attitude maintained and dried therein at 140° C. for 20 minutes to form an undercoat layer having a thickness of 3.5 μm thereon.

2 Parts of a polyvinylbutyral resin (XYHL, manufactured by UCC) were dissolved in 200 parts of methyl ethyl ketone. To the solution were added 10 parts of a tris-azo pigment having a structure represented by the following structural formula (8) This was then dispersed in a ball mill for 340 hours.

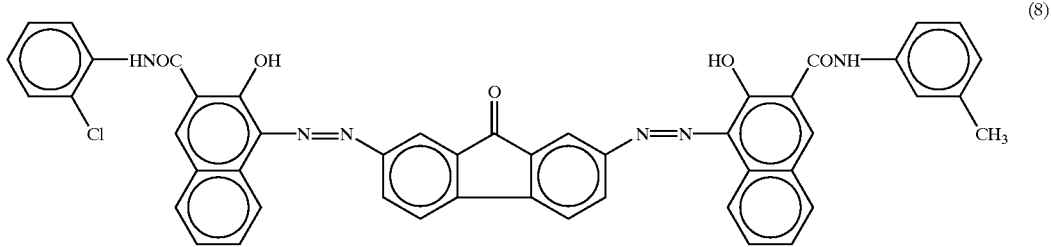

(8)

To the dispersion were added 200 parts of cyclohexanone. This was dispersed for 1 hour and then diluted with cyclohexanone with stirring such that the solid content was 1.5% by weight, thereby obtaining a coating liquid for a charge generating layer. The aluminum drum on which the undercoat layer had been formed was immersed in the charge generating layer coating liquid to coat the drum with the coating liquid and then dried as in the case of the undercoat layer at 120° C. for 20 minutes to form a charge generating layer having a thickness of about 0.2 μm.

The aluminum drum on which the undercoat layer and the charge generating layer had been formed was then immersed in a coating liquid for a charge transporting layer obtained by dissolving 1 part of a charge transporting material having a structure represented by the following structural formula (9), 1 part of a bisphenol Z polycarbonate resin, 0.04 part of a silicone oil (KF-50, made by Shin-Etsu Chemical Co., Ltd.) in 8parts of tetrahydrofuran.

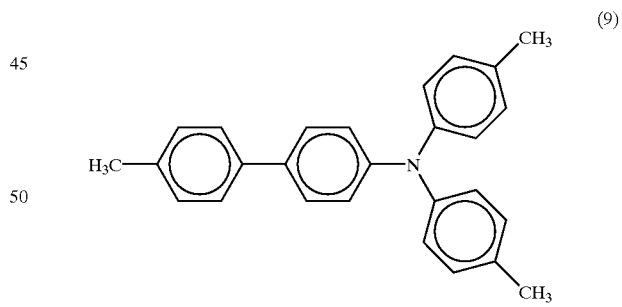

(9)

The aluminum drum was drawn up at a constant rate, and the coating was dried at 120° C. for 2 hours to form a charge transporting layer having an average thickness of about 10.5 μm on the charge generating layer.

A coating liquid for forming an uppermost layer was prepared by dispersing 3 parts of the charge transporting material of the above formula (9) and 3 parts of aluminum oxide (purity: 4N, average particle diameter: 0.3 μm) in 50 parts of cyclohexanone in which 4 parts of bisphenol Z polycarbonate resin had been dissolved. After 24 hour dispersing operation, the dispersion was diluted with tetrahydrofuran to obtain the coating liquid having a solid matter content of 5% by weight. The coating liquid was then applied by spray coating onto the charge transporting layer and the coating was dried at 145° C. for 20 minutes to form an uppermost layer having a thickness of about 2.5 µm, thereby obtaining a photoconductor in the form of a drum. The above procedures were repeated in the same manner as described to obtain three additional photoconductor drums.

The surface of each of the thus obtained photoconductors was measured for a sectional curve using a surface roughness meter (Surfcom 1400A, made by Tokyo Seimitsu K.K.) through a length of 5 mm in the axial direction. From the sectional curve, the maximum height in each of regions having a predetermined length along the X-axis of 48 µm was obtained. The smallest values Hm of the maximum heights of the four photoconductor drums were 0.18 µm, 0.19 µm, 0.20 µm and 0.19 µm. The refractive index of the photoconductive layer at the wavelength of 655 nm was 1.97 and, therefore, the required maximum height $\lambda/2n$ was 0.17 µm (0.655/(2×1.97)).

The four photoconductors were incorporated in a color copying machine as shown in FIG. 4 (wavelength of writing light: 655 nm, image writing resolution: 1200 dpi, diameter of writing light beam spot: 48 µm, particle diameter of toner: 7 µm, intermediate transfer belt: non-elastic PVDF rubber), and uniform halftone images of respective colors were outputted. Uniform halftone images free of interference fringes were able to be obtained. A colored animation cell was reproduced by the copying machine. Copies with satisfactory image quality were found to be produced when evaluated with the naked eyes. When the copies were observed through a magnifying glass, a part of the image was found not to be missing in a high density image region. The image missing was significant when the thickness of the toner image formed on the intermediate transfer medium was 30 µm or more.

EXAMPLE 14

A cylindrical mold was immersed in a dispersion obtained by dispersing 18 parts of carbon black, 3 parts of a dispersant and 400 parts of toluene in 100 parts of polyvinylidene fluoride (PVDF) and gently drawn up at a rate of 10 mm/sec. This was dried at room temperature to obtain a uniform PVDF film having a thickness of 75 µm. The cylindrical mold on which the PVDF film having a thickness of 75 µm had been formed was again immersed in the same dispersion and gently drawn up at a rate of 10 mm/sec. This was dried at room temperature to obtain a PVDF film having a thickness of 150 µm. The cylindrical mold on which the PVDF film having a thickness of 150 µm had been formed was then immersed in a dispersion obtained by uniformly dispersing 100 parts of polyurethane prepolymer, 3 parts of a curing agent (isocyanate), 20parts of carbon black, 3 parts of a dispersant and 500 parts of methyl ethyl ketone and drawn up at 30 mm/sec. After air-drying, the process was repeated to form an urethane polymer layer having a thickness of 150 µm.

100 Parts of polyurethane prepolymer, 3 parts of a curing agent (isocyanate), 50 parts of PTFE (polyetetrafluoroethylene) fine particles, 4 parts of a dispersant and 500 parts of methyl ethyl ketone were uniformly dispersed to prepare a coating liquid for a surface layer.

The cylindrical mold on which the urethane prepoymer film having a thickness of 150 µm had been formed was immersed in the surface layer coating liquid and drawn up at 30 mm/sec. After air-drying, the above process was repeated to form a urethane surface layer with a thickness of 5 µm in which the PTFE fine particles were uniformly dispersed. After drying at room temperature, this was subjected to crosslinking at 130° C. for 2 hours, whereby an elastic intermediate transfer belt having a three-layer structure consisting of a PVDF resin layer (150 µm thick), a polyurethane elastic layer (150 µm thick) and a PTFE surface layer (5 µm thick).

Then, Example 13 was repeated in the same manner as described except that the elastic intermediate transfer belt was substituted for the non-elastic PVDF belt. When the colored animation cell was reproduced by the copying machine, copies with excellent image quality were found to be produced. When the copies were observed through a magnifying glass, no missing images were detected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. 2001-321924 filed Oct. 19, 2001 and No. 2002-299482 filed Oct. 11, 2002 inclusive of the specification, claims and drawings, are hereby incorporated by reference herein.

What is claimed is:

1. An image forming method comprising:
   scanning a surface of a photoconductor having a photoconductive layer provided on a conductive support at least along a main scanning direction of said photoconductor with a writing light beam having a wavelength of $\lambda$ µm and a spot diameter $\phi$ µm to form an electrostatic latent image thereon,
   wherein the surface of said photoconductor has such a roughness that a sectional curve thereof along said main scanning direction is represented by a function y=f(x) when the main scanning direction and a direction of a vertical height are assumed to be an X-axis and a Y-axis, respectively, and
   wherein a maximum height of said sectional curve in a region from an arbitrary position x on the X-axis to a position (x+$\phi$) on the X-axis is at least $\lambda/2n$ µm where n is a refractive index of said photoconductive layer at the wavelength of said light beam, said maximum height being a distance between a maximum level in the direction of the Y-axis of the sectional curve in said region and a minimum level in the direction of the Y-axis of the sectional curve in said region.

2. A method as claimed in claim 1, wherein a maximum magnitude of said sectional curve is from $\lambda/2n$ to $\lambda/2n$ µm.

3. A method as claimed in claim 1, wherein the surface of said photoconductor has filler particles exposed thereon and wherein an average particle diameter of primary particles forming said filler particles is between 0.01 and 1.0 µm.

4. A method as claimed in claim 3, wherein said filler particles comprise metal oxide particles.

5. A method as claimed in claim 4, wherein said metal oxide comprises an α-aluminum oxide.

6. A method as claimed in claim 1, wherein said photoconductive layer comprises a charge generating layer and a charge transporting layer provided on said charge generating layer and providing the surface of said photoconductor, wherein said charge transporting layer comprises a metal oxide, a charge transport material and a polycarbonate resin.

7. A method as claimed in claim 1, wherein said conductive support comprises an unmachined drum or an unmachined belt.

8. A method as claimed in claim 1, wherein said conductive support comprises a drum machined with a flat cutting tool.

9. A method as claimed in claim 1, wherein said spot diameter φ of said writing light beam is at most 60 μm.

10. A method as claimed in claim 1, wherein said wavelength λ of said writing light beam is at most 0.70 μm.

11. A method as claimed in claim 1, wherein plural writing light beams are outputted simultaneously to form plural images.

12. A method as claimed in claim 1, wherein said writing light beam is outputted in a gradient reproduction mode of a multivalued form.

13. A method as claimed in claim 1, wherein said photoconductive layer comprises a charge generating layer and a charge transporting layer provided on said charge generating layer, wherein said charge transporting layer has a thickness of at most 15 μm.

14. A method as claimed in claim 1, wherein the writing light beam has a resolution of at least 1,000 dpi.

15. An image forming apparatus comprising:

a photoconductor having a photoconductive layer provided on a conductive support; and an exposing means for scanning a surface of the photoconductor with a writing light beam having a wavelength of λ μm and a spot diameter φ μm along at least a main scanning direction to form an electrostatic latent image thereon, wherein the surface of said photoconductor has such a roughness that a sectional curve thereof along the main scanning direction is represented by a function $y=f(x)$ when the main scanning direction and a direction of a vertical height are assumed to be an X-axis and a Y-axis, respectively, and wherein a maximum height of said sectional curve in a region from an arbitrary position x on the X-axis to a position (x+φ) on the X-axis is at least λ/2n μm where n is a refractive index of said photoconductive layer at the wavelength of said light beam, said maximum height being a distance between a maximum level in the direction of the Y-axis of the sectional curve in said region and a minimum level in the direction of the Y-axis of the sectional curve in said region.

16. An image forming apparatus as claimed in claim 15, further comprising:

a developing means containing a toner configured to develop the electrostatic latent image on said photoconductor, wherein said toner has an average particle diameter of at most 8 μm.

17. An image forming apparatus as claimed in claim 15, further comprising:

means for producing full color images.

18. An image forming apparatus as claimed in claim 17, further comprising:

a plurality of developing means containing toners with different colors for developing electrostatic latent images on said photoconductor with respective toners to form developed toner images on said photoconductor; and an intermediate transfer belt configured to receive the developed toner images from said photoconductor successively such that received toner images are superposed to form a color image, said intermediate transfer belt being operable to transfer the color image to a recording medium.

19. An image forming apparatus as claimed in claim 18, wherein said intermediate transfer belt comprises an elastic material.

20. An image forming apparatus as claimed in claim 18, wherein said developing means are configured so that the color image formed on said intermediate transfer belt has a thickness of at least 30 μm.

21. An image forming apparatus as claimed in claim 17, comprising a plurality of the photoconductors, a plurality of developing means containing toners with different colors for developing electrostatic latent images on respective photoconductors, and an elastic intermediate transfer belt configured to receive the developed toner images from said photoconductors successively such that received toner images are superposed to form a color image, said intermediate transfer belt being operable to transfer the color image to a recording medium.

22. A photoconductor adapted to be scanned with a writing light beam having a wavelength of λ μm and a spot diameter φ μm along at least a main scanning direction to form an electrostatic latent image thereon, comprising:

a photoconductive layer provided on a conductive support, wherein a surface of said photoconductor has such a roughness that a sectional curve thereof along the main scanning direction is represented by a function $y=f(x)$ when the main scanning direction and a direction of a vertical height are assumed to be an X-axis and a Y-axis respectively, and wherein a maximum height of said sectional curve in a region from an arbitrary position x on the X-axis to a position (x+φ) on the X-axis is at least λ/2n μm where n is a refractive index of said photoconductive layer at the wavelength of said light beam, said maximum height being a distance between a maximum level in the direction of the Y-axis of the sectional curve in said region and a minimum level in the direction of the Y-axis of the sectional curve in said region.

23. A process cartridge freely detachable from an image forming apparatus, comprising:

the photoconductor according to claim 22; and at least one of charging means, image exposure means, developing means, image transfer means, and cleaning means.

* * * * *